United States Patent [19]

Güenther

[11] 4,239,933
[45] Dec. 16, 1980

[54] CIRCUIT ARRANGEMENT FOR RELEASING A KEYBOARD STORE IN TELEPRINTERS OR DATA PRINTERS

[75] Inventor: Gerd J. Güenther, Munich, Fed. Rep. of Germany

[73] Assignee: Siemens Aktiengesellschaft, Berlin & Munich, Fed. Rep. of Germany

[21] Appl. No.: 36,057

[22] Filed: May 4, 1979

[30] Foreign Application Priority Data

May 11, 1978 [DE] Fed. Rep. of Germany ....... 2820673

[51] Int. Cl.³ .................................... H04L 13/08
[52] U.S. Cl. .......................................... 178/17.5
[58] Field of Search ................. 178/17.5, 79, 80; 340/365 R, 365 E, 365 S; 365/195; 179/90 BB

[56] References Cited

FOREIGN PATENT DOCUMENTS 2047885 3/1972 Fed. Rep. of Germany .......... 178/17.5
2556903 10/1977 Fed. Rep. of Germany .......... 178/17.5

*Primary Examiner*—Thomas A. Robinson
*Attorney, Agent, or Firm*—Hill, Van Santen, Steadman, Chiara & Simpson

[57] ABSTRACT

A circuit arrangement for releasing a keyboard store in teleprinters or data printers, in which the keyboard store, upon becoming completely full, is blocked with respect to the further input of characters, and following which a release key must be actuated before a further input of characters can be effected. However, such an input cannot take place into the keyboard store until the latter has been completely emptied. The circuit arrangement contains a switching stage which, following actuation of the release key and emptying of the keyboard store, produces a signal which cancels the blockage of the keyboard store.

8 Claims, 1 Drawing Figure

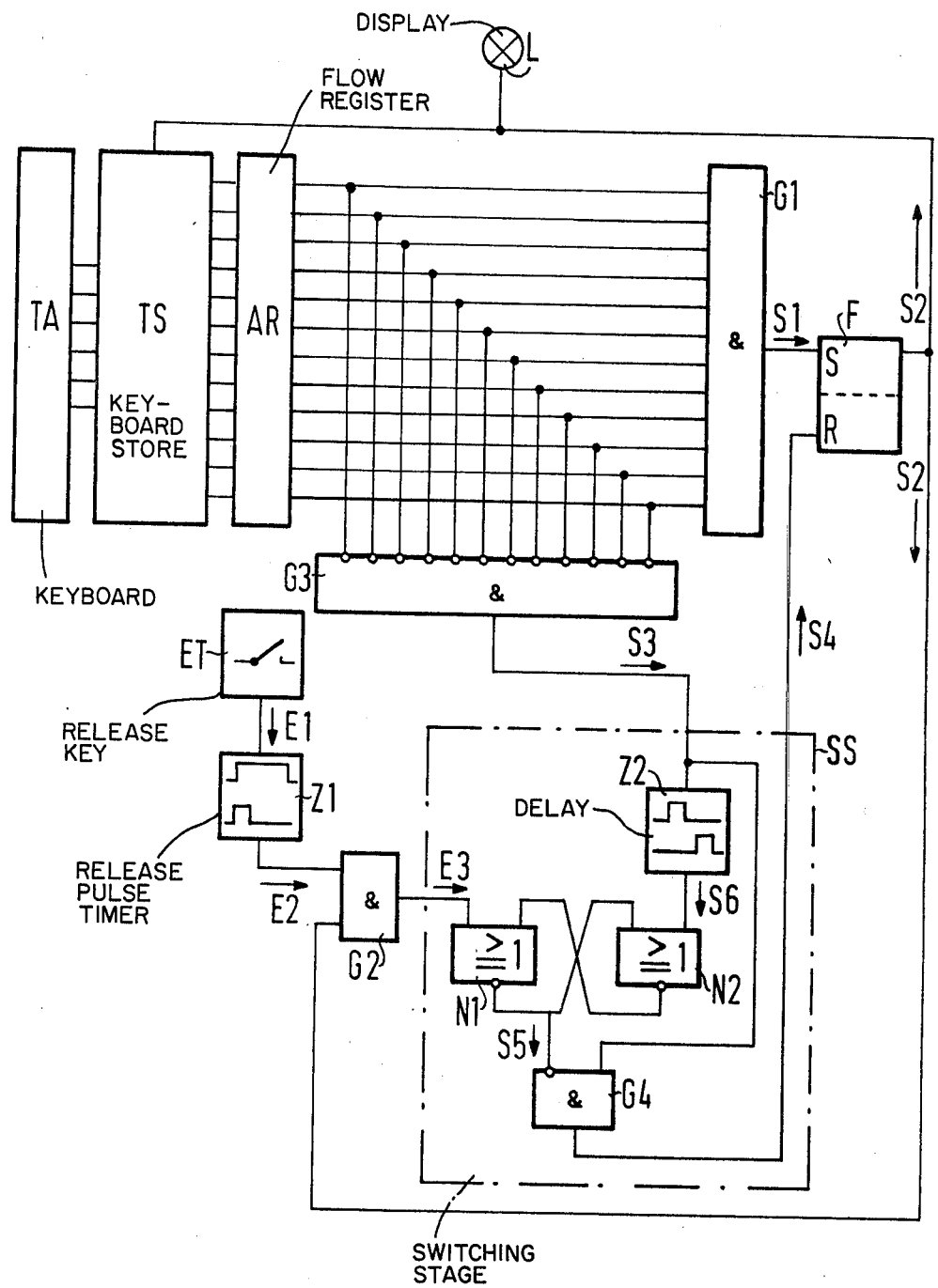

CIRCUIT ARRANGEMENT FOR RELEASING A KEYBOARD STORE IN TELEPRINTERS OR DATA PRINTERS

BACKGROUND OF THE INVENTION

The invention relates to a circuit arrangement for releasing a keyboard store in teleprinters or data printers, in which a flip-flop is provided which is set when the keyboard store becomes full and produces a blocking signal which prevents a further input of characters into the keyboard store, until a release key has been actuated which produces a release signal to allow further characters to be input into the keyboard store.

German Patent No. 25 56 903 discloses a circuit arrangement by means of which a releasing of the keyboard store of a teleprinter or data printer may be effected. In such circuit arrangement, in order to avoid the loss of characters input into the keyboard store when the latter becomes completely full, further characters are prevented, by means of a blocking device, from being input into the store. Simultaneously, therewith, the blocking device indicates that the keyboard store is full. The circuit arrangement contains a release key which must be actuated when the keyboard store is at least partially empty in order to enable the input of further characters into the keyboard store.

In such known circuit arrangements, when the keyboard store becomes completely full, the operator cannot operate the release key until the keyboard store has become at least partially empty, as only then does a release signal, emitted as a result of actuation of the release key, become active. If the release key is operated as soon as a few characters had been read out from the keyboard store, it can readily occur that the store will very rapidly again fill up and the release key will have to be reactuated. These characteristics of the known ciruit arrangements can be burdensome to operators.

BRIEF SUMMARY OF THE INVENTION

It is therefore the objective of the invention to provide a circuit arrangement for releasing a keyboard store, which additionally improves the ease of operation of teleprinters or data printers provided with such a store.

This objective is realized, in accordance with the invention, in a circuit arrangement of the type described employing a flip-flop which is set when the keyboard store becomes full, by the provision of a switching stage to which the release signal and a signal produced following the emptying of the keyboard store, are supplied, which switching stage produces a signal which is utilized to reset the flip-flop.

The circuit arrangement in accordance with the invention has the advantage that no input to the keyboard store can be undertaken when the store is only partially empty. A further input of characters is not effected until the keyboard store is completely empty and a release key has been subsequently depressed. As a result, the keyboard store is not refilled merely after only a few characters have been emitted.

In a simple construction of circuit arrangements in accordance with the invention, the switching stage contains an AND-gate, to the first input of which there is supplied a signal which represents the release signal, and to the second input of which is supplied a signal which is produced when the keyboard store has become empty, with the output of the AND-gate supplying a signal which is operative to reset the flip-flop.

In order to enable the actuation of the release key at any desired time after the keyboard store has become full, it is advantageous to provide a further flip-flop ahead of the first input of the AND-gate, to the setting input of which flip-flop the release signal is applied, and to the resetting input of which there is supplied a signal which is produced when the keyboard store has become empty.

In order to prevent the release key from being effective before the blocking signal occurs when the keyboard store has become full, it is advantageous to provide a further AND-gate ahead of the setting input of such further flip-flop, which AND-gate logically links the blocking signal with the release signal.

By the provision of a timing element post-connected with respect to the release key, which timing element produces a pulse-like release signal at the beginning of the operation of the release key, the operation of the release key has no effect if the keyboard store is full at the time the release key is depressed.

To prevent the resetting of the further flip-flop until the latter has supplied a signal to its output, it is advantageous to provide a suitable timing element ahead of the resetting input of the further flip-flop, which timing element delays by a predetermined length of time, the signal produced when the keyboard store has become empty.

BRIEF DESCRIPTION OF THE DRAWING

The FIGURE of the drawing illustrates, in block form, an exemplary embodiment of the invention.

DETAILED DESCRIPTION

In the circuit arrangement illustrated in the FIGURE, characters are supplied by means of a keyboard TA, in the form of code characters composed of six bits, to a keyboard store TS in which up to twelve code characters can be stored. Such store is operative to immediately store the code characters of rapidly input characters, whereupon they are uniformly transmitted at the prescribed speed. At the output side of the keyboard store TS is disposed a flow register AR comprising a chain of flip-flops. Each flip-flop is assigned to a respective storage space accommodating one code character in the keyboard store TS. When the storage space is occupied, the corresponding flip-flop in the flow register AR is set.

When the keyboard store TS is empty and all flip-flops in the flow register AR have been reset, an AND-gate G3, provided with inverting inputs, supplies a signal S3 from its output to the switching stage SS. When the flip-flop in the switching stage SS is set, the signal S3 is supplied over AND-gate G4 to the output of the switching stage where it is emitted as the resetting signal S4 for the flip-flop F. Resetting of the flip-flop F functions to terminate the blocking signal S2, as a result of which the illumination of the warning display L is also terminated and the keyboard store TS is released for the further input of additional characters. Simultaneously, therewith, the AND-gate G2 becomes blocked.

The switching stage SS includes a timing element Z2 which delays the signal S3 by a predetermined length of time and from the output of the timing element Z2, a signal S6 is emitted which resets the flip-flop of the switching stage SS. The delay time of the element Z2 is so selected that the flip-flop is not reset until the supply of the signal S4 to the flip-flop F has been assured.

If the release key ET is actuated before the keyboard store TS is completely full, the operation is ineffective since the blocking signal S2 is not present and consequently the AND-gate G2 will not supply a release signal E3. Even when the release key ET is held depressed until the keyboard store TS is completely full, the flip-flop in the switching stage SS will not be set as the post-connected timing element Z1 emits a pulse-like release signal E2 only at the beginning of the actuation of the release key ET. Consequently, in order to release the keyboard store TS when it has become completely full, it is necessary to release the release key ET and then redepress. Only then will a release signal E3 be emitted over the AND-gate G2 to the switching stage SS.

If the release key ET is not actuated until the keyboard store TS has become completely empty, the flip-flop in the switching stage SS supplies a signal S5 even though the signal S6, functioning to reset the flip-flop, is present. This is achieved by virtue of the construction of the flip-flop utilizing the two NOR-gates N1 and N2, as the NOR-gate N1, in any case, supplies a signal S5 when the release signal E2 occurs.

Although the invention has been described with respect to preferred embodiments, it is not to be so limited as changes and modifications can be made which are within the full intended scope of the invention as defined by the appended claims.

I claim as my invention:

1. A circuit arrangement for releasing a keyboard store in teleprinters or data printers, comprising a keyboard store, a flip-flop, means operatively connecting said flip-flop to the keyboard store for setting said flip-flop when said store becomes full, with said flip-flop thereby producing a blocking signal for preventing the input of further characters into the keyboard store, a release key actuatable to produce a release signal which enables further input of characters into the keyboard store, means for producing an empty signal when the keyboard store has become empty, and a switching stage to which said release signal and said empty signal are supplied, for producing a signal for resetting said flip-flop.

2. A circuit arrangement according to claim 1, wherein the release key has a post-connected timing element which produces a pulse-like release signal at the initial operation of the release key.

3. A circuit arrangement according to claim 1, wherein the switching stage contains an AND-gate having a first input to which said release signal is applied, and having a second input to which said empty signal which is produced when the keyboard store has become empty is applied, and having an output connected to said flip-flop for supplying the reset signal thereto.

4. A circuit arrangement according to claim 3, wherein said AND-gate is preceded by a further flip-flop, having a setting input to which said release signal is supplied, and having a resetting input to which said empty signal is supplied.

5. A circuit arrangement according to claim 4, wherein the release key has a post-connected timing element which produces a pulse-like release signal at the initial operation of the release key.

6. A circuit arrangement according to claim 4, wherein the resetting input of said further flip-flop is preceded by a further timing element which delays the empty signal by a predetermined length of time.

7. A circuit arrangement according to claim 4, wherein the setting input of said further flip-flop is preceded by a further AND-gate, which logically links said blocking signal to said release signal.

8. A circuit arrangement according to claim 7, wherein the resetting input of said further flip-flop is preceded by a further timing element which delays the empty signal by a predetermined length of time.

* * * * *